US009544892B2

United States Patent
Kim et al.

(10) Patent No.: US 9,544,892 B2
(45) Date of Patent: Jan. 10, 2017

(54) SYSTEM AND METHOD FOR SEARCHING FOR A CONTROL CHANNEL

(71) Applicant: APPLE INC., Cupertino, CA (US)

(72) Inventors: Youngjae Kim, San Jose, CA (US); Yuchul Kim, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 73 days.

(21) Appl. No.: 14/500,509

(22) Filed: Sep. 29, 2014

(65) Prior Publication Data

US 2015/0092712 A1    Apr. 2, 2015

Related U.S. Application Data

(60) Provisional application No. 61/883,571, filed on Sep. 27, 2013.

(51) Int. Cl.
   *H04W 72/04*    (2009.01)
   *H04L 5/00*    (2006.01)

(52) U.S. Cl.
   CPC .......... *H04W 72/042* (2013.01); *H04L 5/001* (2013.01); *H04L 5/0048* (2013.01); *H04L 5/0053* (2013.01); *H04L 5/0094* (2013.01); *H04L 5/0046* (2013.01)

(58) Field of Classification Search
   None
   See application file for complete search history.

(56) References Cited

U.S. PATENT DOCUMENTS

| 7,292,854 B2 * | 11/2007 | Das | H04W 48/12 370/320 |
| 2010/0254329 A1 * | 10/2010 | Pan | H04L 5/001 370/329 |
| 2010/0322132 A1 * | 12/2010 | Ramakrishna | H04L 1/0038 370/312 |
| 2011/0064042 A1 * | 3/2011 | Kim | H04L 5/1469 370/329 |
| 2011/0085458 A1 * | 4/2011 | Montojo | H04L 1/0038 370/252 |

(Continued)

FOREIGN PATENT DOCUMENTS

FI    WO 2008097177 A2 *  8/2008  .......... H04L 1/0035

*Primary Examiner* — Ayaz Sheikh
*Assistant Examiner* — Tarell Hampton
(74) *Attorney, Agent, or Firm* — Fay Kaplun & Marcin, LLP

(57) ABSTRACT

A method performed at a base station and a corresponding method performed at a station receiving a transmission from the base station. The methods relate to signaling the station as to a number of PDCCH information that is included in the transmission so the station may terminate a search when the station has identified the PDCCHs in the transmission. The method performed by the station includes receiving the transmission that includes at least one PDCCH information, each PDCCH information having a respective mapped downlink control information (DCI). The method further includes detecting one of the PDCCH information in the transmission and determining lengths of information bits of the DCI and the PDCCH information. The method also includes terminating a search for a further one of the PDCCH information when a first type of padding is used for the mapping of the DCI over the PDCCH information based on the lengths.

18 Claims, 4 Drawing Sheets

(56) References Cited

U.S. PATENT DOCUMENTS

| | | | | |
|---|---|---|---|---|
| 2012/0021756 A1* | 1/2012 | Kwon | H04L 5/0053 | 455/450 |
| 2012/0044899 A1* | 2/2012 | Kwon | H04L 5/001 | 370/329 |
| 2012/0218964 A1* | 8/2012 | Park | H04B 7/155 | 370/329 |
| 2013/0016655 A1* | 1/2013 | Heo | H04L 5/001 | 370/328 |
| 2013/0016672 A1* | 1/2013 | Yang | H04L 1/0046 | 370/329 |
| 2013/0114565 A1* | 5/2013 | Chen | H04L 5/0053 | 370/330 |
| 2013/0176918 A1* | 7/2013 | Fu | H04B 7/0404 | 370/280 |
| 2014/0334440 A1* | 11/2014 | Wong | H04W 36/0011 | 370/331 |
| 2015/0003311 A1* | 1/2015 | Feuersaenger | H04W 52/0225 | 370/311 |
| 2015/0373668 A1* | 12/2015 | Lee | H04W 72/042 | 370/329 |
| 2016/0044638 A1* | 2/2016 | Gao | H04W 72/042 | 370/280 |

* cited by examiner

SYSTEM AND METHOD FOR SEARCHING FOR A CONTROL CHANNEL

PRIORITY CLAIM/INCORPORATION BY REFERENCE

This application claims priority to U.S. Provisional Application 61/883,571 entitled "System and Method for Searching for PDCCH," filed on Sep. 27, 2013, the entirety of which is incorporated herein by reference.

BACKGROUND INFORMATION

In conventional wireless communication systems, a network may maintain connections with multiple stations and serve them by scheduling/sending control or data packets in each subframe. A subframe is the basic time unit for the network to schedule data packets to one or more stations. When a data packet is scheduled to a station, the station may receive one or more control channels that include scheduling information. An exemplary control channel is a physical downlink control channel (PDCCH) that includes PDCCH information, each PDCCH information relating to a respective carrier. Accordingly, each of the PDCCH information contains the control information about the corresponding physical downlink shared channel (PDSCH), e.g., Resource Block (RB) allocation, Modulation and Coding Scheme (MCS), HARQ ID, Transport Block Size (TBS), etc.

SUMMARY

In one exemplary embodiment, a station performs a method. The method includes receiving a transmission from a base station of a network, the transmission including at least one control channel information, each control channel information having a respective downlink control information (DCI) mapped thereover, detecting one of the control channel information in the transmission, determining whether carrier aggregation is activated and cross-carrier scheduling is configured for the station, determining whether a length of information bits of the DCI is less than a length of the information bits of the control channel information when the carrier aggregation is activated and the cross-carrier scheduling is configured and terminating a search for a further one of the control channel information when the length of information bits of the DCI is less than the length of information bits of the control channel information and a first type of padding is used for the mapping of the DCI over the control channel information.

In another exemplary embodiment, a base station of a Long Term Evolution (LTE) network performs a method. The method includes determining a number of physical downlink control channel (PDCCH) information that is to be transmitted to a station connected to the base station, generating a transmission including the number of PDCCH information, each PDCCH information having a respective downlink control information (DCI) mapped thereover, determining whether a length of information bits of the DCI is less than a length of information bits of the PDCCH information and padding the information bits of the DCI with one of a first type of padding or a second type of padding, wherein the first or second type of padding is selected based on the number.

In a further exemplary embodiment, a station includes a tranceiver and a processor. The transceiver is configured to establish a connection to a base station of a Long Term Evolution (LTE) network and receive a transmission from the base station, the transmission including at least one physical downlink control channel (PDCCH) information, each PDCCH information having a respective downlink control information (DCI) mapped thereover. The processor is coupled to a memory and is configured to detect one of the PDCCH information in the transmission, determine whether a length of information bits of the DCI for the detected one of the PDCCH information is less than a length of the information bits of the PDCCH information and terminate a search for a further one of the PDCCH information when the length of information bits of the DCI is less than the length of information bits of the control channel information and a first type of padding is used for the mapping of the DCI over the PDCCH information.

DETAILED DESCRIPTION

Figure 1:
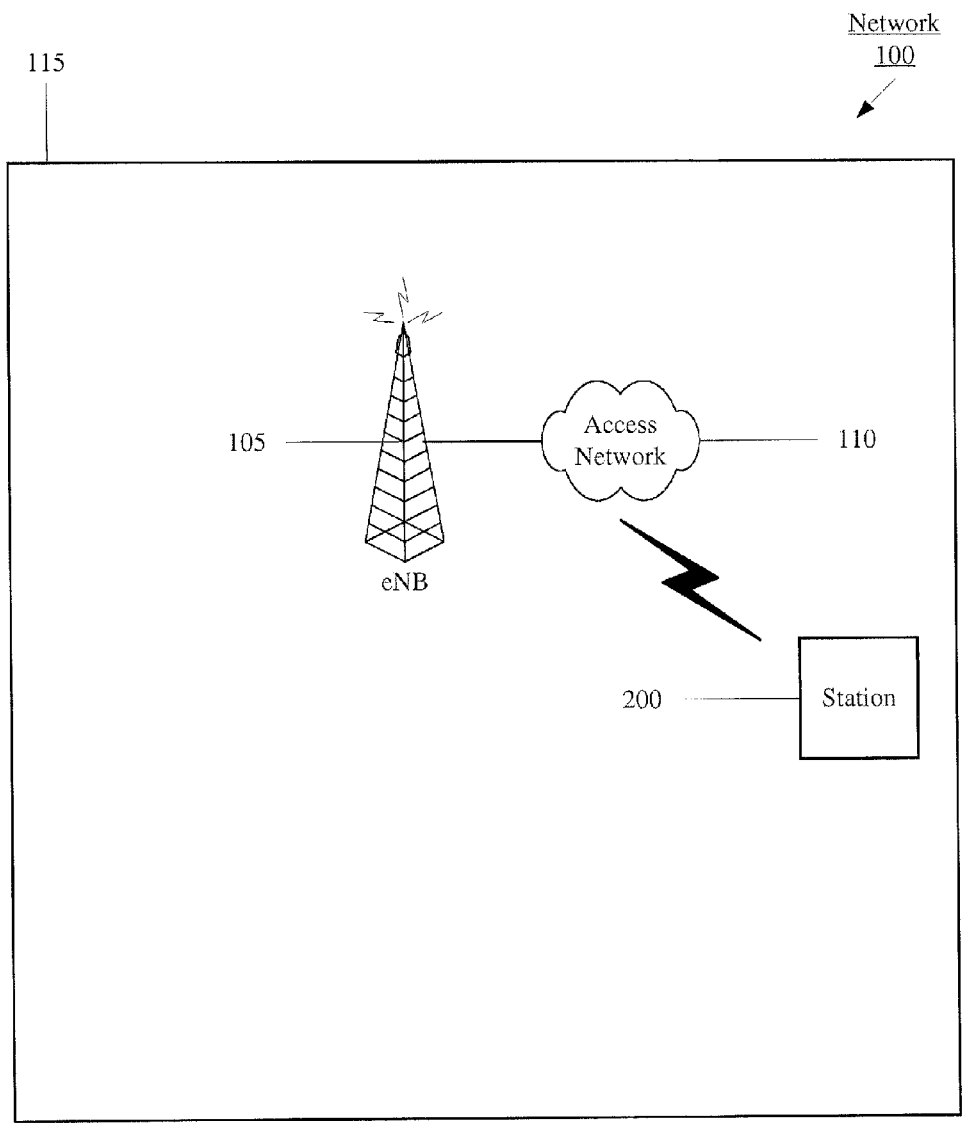
FIG. 1 shows an exemplary network utilizing a modified transmission indicative of a number of PDCCHs.

The exemplary embodiments may be further understood with reference to the following description and the related appended drawings, wherein like elements are provided with the same reference numerals. The exemplary embodiments are related to a system and method for searching for control channel information. In one exemplary embodiment, the control channel is the PDCCH and the searching is for a number of PDCCH information related to a subframe within a transmission from a network component. Specifically, in a Long Term Evolution (LTE) network, the component (e.g., an eNodeB (hereinafter "eNB")) may transmit the transmission including the one or more PDCCH information and downlink control information (DCI) which is mapped over the PDCCH information. When the data size or length of the DCI is less than the length of the PDCCH information, remaining bits from the DCI being mapped may be set to a predetermined value to indicate whether a number of PDCCH within the transmission is only one. Accordingly, the station may conserve power by not wasting additional power required for processing to search for additional PDCCH information in the transmission that does not exist. The PDCCH information, the subframe, the transmission, the LTE network, the eNB, the DCI, the mapping, the remaining bits, and related methods will be described in further detail below.

A station may establish a connection to a wireless communications network via a base station (e.g., an eNB in LTE networks). To properly be prepared for demodulating transmitted signals (i.e., received signals), the station must be configured with proper settings. Specifically, properties related to the physical layer of the transceiver used to connect to the network must be known. For example, the channel (e.g., band of frequencies) must be known for the incoming signal in order for it to be properly received. While connected to the network, the eNB may transmit the requisite information in a transmission to the station such that a subsequent PDSCH information may be decoded properly for the wireless properties to be determined. For example, given a frame with a duration of 10 milliseconds (ms), each subframe will have a duration of 1 ms and the subframe may include PDCCH information, which is part of the transmission to the station. Upon decoding the PDCCH information, the payload relating to the control channel information may be utilized in determining the format of the PDSCH to calculate the wireless properties.

In a first manner of operation of the LTE network, only one cell-radio network temporary identity (C-RNTI) configured PDCCH is allowed to exist in the station-specific space within a subframe. That is, there was only one PDCCH for a given subframe. Accordingly, the station-specific search space is a dedicated search space for a particular station. A search functionality may therefore be configured to immediately stop searching upon detecting a valid C-RNTI configured PDCCH in this search space as there is only the one PDCCH.

In a second manner of operation of the LTE network such as in LTE Advanced networks, cross-carrier scheduling may be configured with carrier aggregation such that multiple PDCCHs may exist in one subframe for the station. Accordingly, the station-specific search space for a subframe of the station may include more than one PDCCH. Therefore, the station is required to search the entire station-specific search space for every possible PDCCH that may exist within the search space. For example, even after a valid PDCCH has been detected in the search space, the search is continued to detect whether there are any additional valid PDCCHs. In this scenario where cross-carrier scheduling is configured with carrier aggregation, the search being performed in the entire station-specific search space for every subframe to detect every possible PDCCH may cause the station to expend unnecessary power. The exemplary systems and methods provide a manner of reducing the power consumption of a station when cross-carrier scheduling is configured with carrier aggregation, particularly when only one PDCCH is included in the station-specific search space.

In the LTE Advanced network, very high data rates may be achieved by increasing the transmission bandwidths over those that may be supported by a single carrier or channel. Specifically, carrier aggregation may be used to accomplish this. Using LTE Advanced carrier aggregation, it is possible to utilize more than one carrier and in this way increase the overall transmission bandwidth. These channels or carriers may be in contiguous elements of the spectrum or in different bands. Accordingly, LTE carriers may perform the carrier aggregation using intra-band contiguous component carriers, intra-band non-contiguous component carriers, or inter-band carrier aggregation. The intra-band component carriers utilize a single band for the components. The contiguous type includes two or more components adjacent each other within the single band whereas the non-contiguous type includes two or more components separated from each other within the single band. The inter-band type includes two or more components being in different bands.

When carriers are aggregated, each carrier is referred to as a component carrier. There are two categories: primary and secondary component carriers. The primary component carrier is the main carrier in any group. Therefore, there is a primary downlink carrier and an associated uplink primary component carrier. The secondary component carrier may be one or more secondary component carriers. Those skilled in the art will understand that the configuration of the primary component carrier is station specific and is determined according to the loading on the various carriers as well as other relevant parameters. In addition, the association between the downlink primary carrier and the corresponding uplink primary component carrier is cell specific. The information is signaled to the station as part of an overall signaling between the station and the base station (e.g., eNB).

When LTE carrier aggregation is used, it is necessary to be able to schedule the data across the carriers and to inform the terminal of the format of the PDSCH in each component carrier. All of this information may be transmitted through the primary carrier if cross carrier scheduling is used. Enabling of the cross carrier scheduling is achieved individually via the radio resource control (RRC) signaling on a per component carrier basis or a per terminal basis. When no cross carrier scheduling is arranged, the downlink scheduling assignments are achieved on a per carrier basis. That is, they are valid for the component carrier on which they were transmitted. For the uplink, an association is created between one downlink component carrier and an uplink component carrier. In this way, when uplink grants are sent, the station is aware of which uplink component carrier it applies.

Where cross carrier scheduling is active, the PDSCH on the downlink may be transmitted on different component carriers other than that of the PDCCH. The carrier indicator in the PDCCH provides the information about the component carriers used for the PDSCH. It is necessary to be able to indicate to which component carrier in any aggregation scheme a control signal relates. To facilitate this, component carriers are numbered. The primary component carrier is numbered zero, for all instances, and the different secondary component carriers are assigned a unique number through the station specific RRC signaling. Therefore, even if the station and the eNB have different understandings of the component carrier numbering during reconfiguration, transmissions on the primary component carrier may still be scheduled.

Generating the transmission from the eNB to the station for a subframe including the one or more PDCCH when carrier aggregation is activated and cross-carrier scheduling is configured for the station, the DCI may be mapped over the PDCCH information bits. It is the DCI bits that are mapped over the PDCCH information bits. Those skilled in the art will understand that the DCI bits will be, at most, the same length of the PDCCH information bits. However, often, the DCI bits are less than the PDCCH information bits. When the DCI bits are less than the PDCCH information bits, the remaining PDCCH information bits are "padded" with null values. For example, a set of zeroes may be padded for a remaining number of PDCCH information bits that were not mapped over with the DCI bits. The exemplary system and method utilize these padded values to indicate whether only a single PDCCH is included within a transmission for a subframe to the station.

FIG. 1 shows an exemplary network 100 utilizing a modified transmission indicative of a number of PDCCH. The network 100 may be a LTE network under the 3GPP specification. Accordingly, the network 100 may operate in the above described manner in which one or more PDCCH information is included in each subframe that is transmitted to a station 200 such that the PDCCH payload used for determining the wireless properties and grant information included in the PDCCH information respective of the carrier may be utilized for that subframe. The network 100 may include an eNB 105 and an access network 110 and have an operating area 115. As the station 200 is within the operating area 115, a wireless connection may be established between the eNB 105 and the station 200 via the access network 110. It should be noted that the network 100 may include further components such as a server. The functionalities performed by the eNB 105 may be embodied as a portion of the server or may be a separate network component.

It should be noted that while the exemplary embodiments are described with reference to an LTE network, the exemplary embodiments are not limited to LTE networks. The functionalities described herein may be applied to any type of network that includes the characteristics described for the LTE network, e.g., supports carrier aggregation, supports cross carrier scheduling, may include multiple control channel information in a search space, etc.

The eNB 105 may be configured to determine the information included in a transmission to the station 200. Specifically, the eNB 105 may generate the transmission to include the one or more PDCCH information in which each PDCCH has a mapped DCI. Each of the PDCCH carries the DCI that has information used to determine the wireless properties of the associated carrier (e.g., modulation and coding scheme, transport block size, HARQ process ID, etc.) as well as grants for the station in the carrier channel during the subframe related to the PDCCH. The DCI may be determined respective of a single station such as the station 200. The eNB 105 may also generate transmissions for further stations (not shown) that have established a connection to the eNB.

The eNB 105 may also determine whether the station 200 has carrier aggregation activated as well as cross-carrier scheduling configured. If the station 200 does not have carrier aggregation activated, the station 200 relies upon the first example discussed above in which only one C-RNTI configured PDCCH is within the transmission from the eNB 105. If the station has carrier aggregation activated but does not have cross-carrier scheduling configured, the station 200 may again rely upon the first example with only one C-RNTI. However, when cross-carrier scheduling is configured with carrier aggregation, the station 200 may receive one or more PDCCH within the transmission from the eNB 105. The eNB 105 may also map respective DCI over each of the PDCCH prior to sending the transmission.

According to the exemplary embodiments, the eNB 105 may further be configured to modify the padding of remaining PDCCH information bits not mapped by the DCI information bits. Specifically, the eNB 105 modifies the padding when the cross-carrier scheduling is configured with carrier aggregation activated for the related subframe of the station 200. As discussed above, a conventional approach is simply to pad zeroes in the remaining PDCCH information bits not mapped by the DCI information bits. The eNB 105 may further adjust this padding to 1's such that when the transmission is decoded, the station 200 is aware from the padding of 1's that only a single PDCCH is included in the transmission. Those skilled in the art will understand that the station 200 is already aware of a size of the information bits included in the PDCCH information as well as the DCI. Accordingly, when the DCI length is less than the PDCCH information, the remaining bits are known to be padding. Therefore, the station 200 may use the information of the padding to determine that only one PDCCH is in the transmission. In this manner, the eNB 105 may generate the transmission to the station 200 for a particular subframe and adjust the padding when the conditions described above are satisfied. Specifically, the conditions relate to the station 200 having carrier aggregation activated, cross-carrier scheduling configured, and the length of the DCI information bits being less than the length of the PDCCH information bits.

In an alternative approach, one or more bits in the PDCCH information bits may be pre-assigned for indicating cross-carrier scheduling instead of using a remaining padded bits. This may reduce the number of available bits for mapping the DCI bits over the PDCCH information bits.

Figure 2:
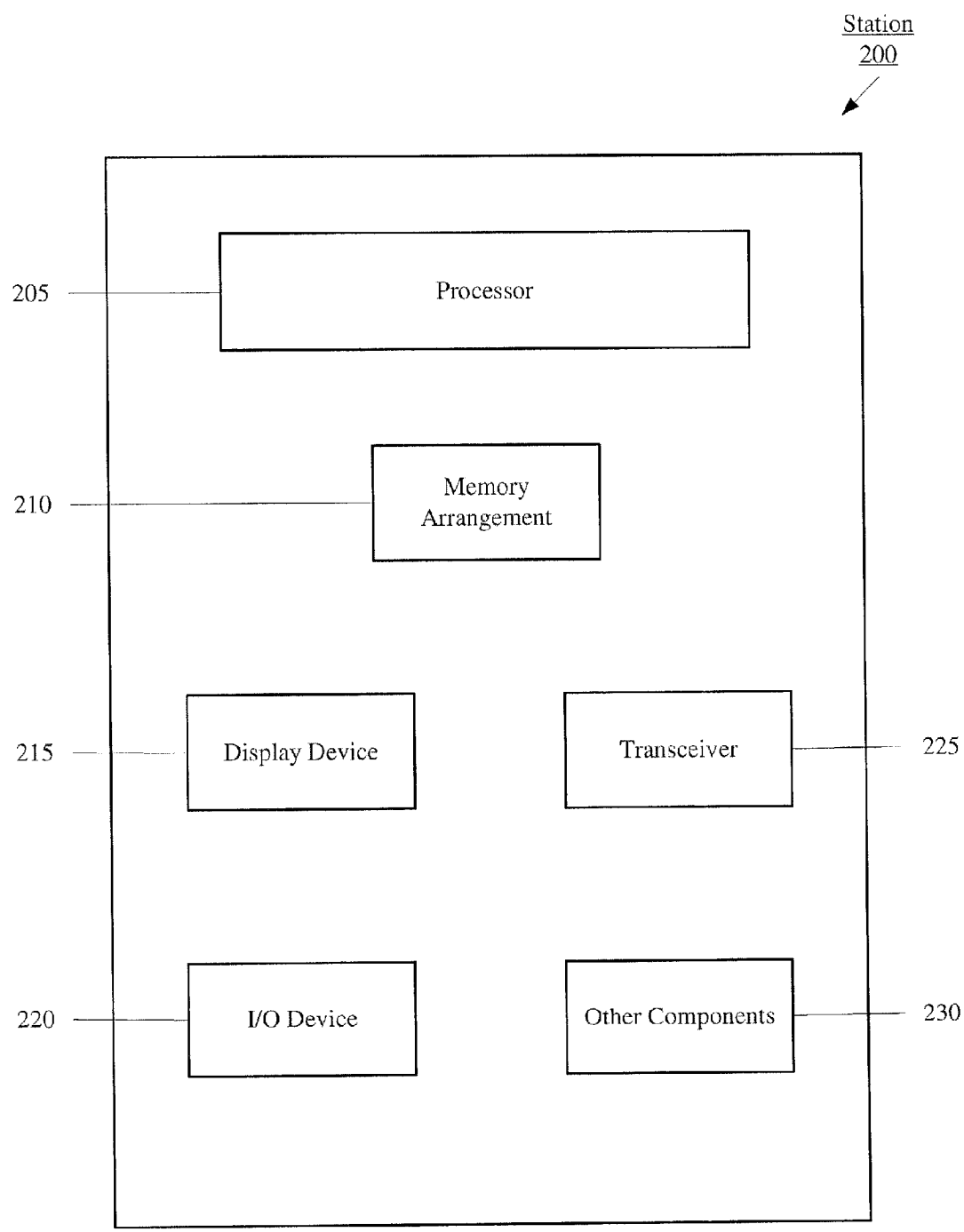
FIG. 2 shows the exemplary station of FIG. 1 receiving the modified transmission while connected to the network.

FIG. 2 shows the exemplary station 200 of FIG. 1 receiving the modified transmission while connected to the network. Specifically, the station 200 may exchange data with the eNB 105 of the LTE wireless network and receive a transmission therefrom. The station 200 may represent any electronic device that is configured to perform wireless functionalities. For example, the station 200 may be a portable device such as a phone, a smartphone, a tablet, a phablet, a laptop, etc. In another example, the station 200 may be a stationary device such as a desktop terminal. The station 200 may include a processor 205, a memory arrangement 210, a display device 215, an input/output (I/O) device 220, a transceiver 225, and other components 230. The other components 230 may include, for example, an audio input device, an audio output device, a battery, a data acquisition device, ports to electrically connect the station 200 to other electronic devices, etc.

The processor 205 may be configured to execute a plurality of applications of the station 200. For example, the applications may include a web browser when connected to a communication network via the transceiver 225. In a specific embodiment, the processor 205 may execute a decoding application for the transmission from the eNB 105. The decoding application may decode the transmission to extract the one or more PDCCH information, the respective DCI information bits mapped over the PDCCH information, and the padding when the DCI information bits has a length less than the length of the PDCCH information bits. The memory 210 may be a hardware component configured to store data related to operations performed by the station 200. Specifically, the memory 210 may store the PDCCH information, the DCI, and the padding. The display device 215 may be a hardware component configured to show data to a user while the I/O device 220 may be a hardware component that enables the user to enter inputs. It should be noted that the display device 215 and the I/O device 220 may be separate components or integrated together such as a touch-screen.

It should be noted that the exemplary decoding application does not need to be executed by the processor 205. In another example, the functionality that is described herein for the decoding application may be performed by the transceiver 225 executing firmware stored on an integrated circuit of the transceiver 225. In a further example, the functionality of the decoding application may be performed by a separate integrated circuit with or without firmware.

The transceiver 225 may be a hardware component configured to transmit and/or receive data. That is, the transceiver 225 may enable communication with other electronic devices directly or indirectly through the LTE network 100 based upon an operating frequency of the network. The transceiver 225 may operate on a variety of different frequencies or channels (e.g., set of consecutive frequencies). Thus, an antenna (not shown) coupled with the transceiver 225 may enable the transceiver 225 to operate on the various frequencies. The transceiver 225 may enable the station 100 to transmit and receive data related to the various applications executed by the processor 205. In order for this data related to the applications to be transmitted/received, the wireless properties must be properly configured. Accordingly, the transceiver 225 may also be used for background communications with the eNB 105. Specifically, the transmission including the one or more PDCCH information with the respective mapped DCIs and with the padding may be received by the station 200 via the transceiver 225.

The station 200 may receive the transmission from the eNB 105 for each subframe in a known specification indicating a schedule of transmissions. As discussed above, the transmission may include the one or more PDCCH information having the mapped DCI. Upon receiving the transmission, the decoding application executed by the processor 205 may decode the transmission. A search for the one or more PDCCHs may be performed from decoding the transmission. Initially, the decoding application may determine if a PDCCH has been successfully detected at all. If no PDCCH is detected, the decoding application may determine whether all possible candidates for the PDCCH of particular carriers have been attempted to be found. If a PDCCH is detected, the decoding application may determine whether a set of conditions are satisfied prior to determining whether a padding is to be assessed. In a first condition, the decoding application determines whether carrier aggregation is activated. If carrier aggregation is not activated, the decoding application need not search for further PDCCH as only one C-RNTI configured PDCCH is included in the transmission. In a second condition, the decoding application determines whether cross-carrier scheduling is activated. If cross-carrier scheduling is not activated, the decoding application again need not search for further PDCCH as only one C-RNTI configured PDCCH is included in the transmission.

If the above conditions are satisfied, the decoding application may determine whether the detected PDCCH included padding. If no padding was included, the length of the DCI information bits may be equal to the length of the PDCCH information bits. Therefore, the decoding application again determines whether all candidates for the PDCCH of particular carriers have been attempted to be found as no additional information may be indicated as no padding or room for this information may be included. If padding has been included, the decoding application may determine whether the 0 padding is used or a 1 padding is used. If the 0 padding is used, the transmission includes more than one PDCCH. Therefore, the decoding application continues the search for further PDCCH (e.g., remaining candidates for the PDCCH of particular carriers). If the 1 padding is used, the decoding application is aware that the detected PDCCH in the transmission is the only PDCCH and may terminate the search for further non-existent PDCCH. It should be understood that the convention of padding 0's or 1's as described above is only exemplary. Other padding conventions may also be used to indicate a single PDCCH or multiple PDCCHS. In addition, it is also possible to pad with a code that indicates an exact number of PDCCHs included in the search space.

Figure 3:
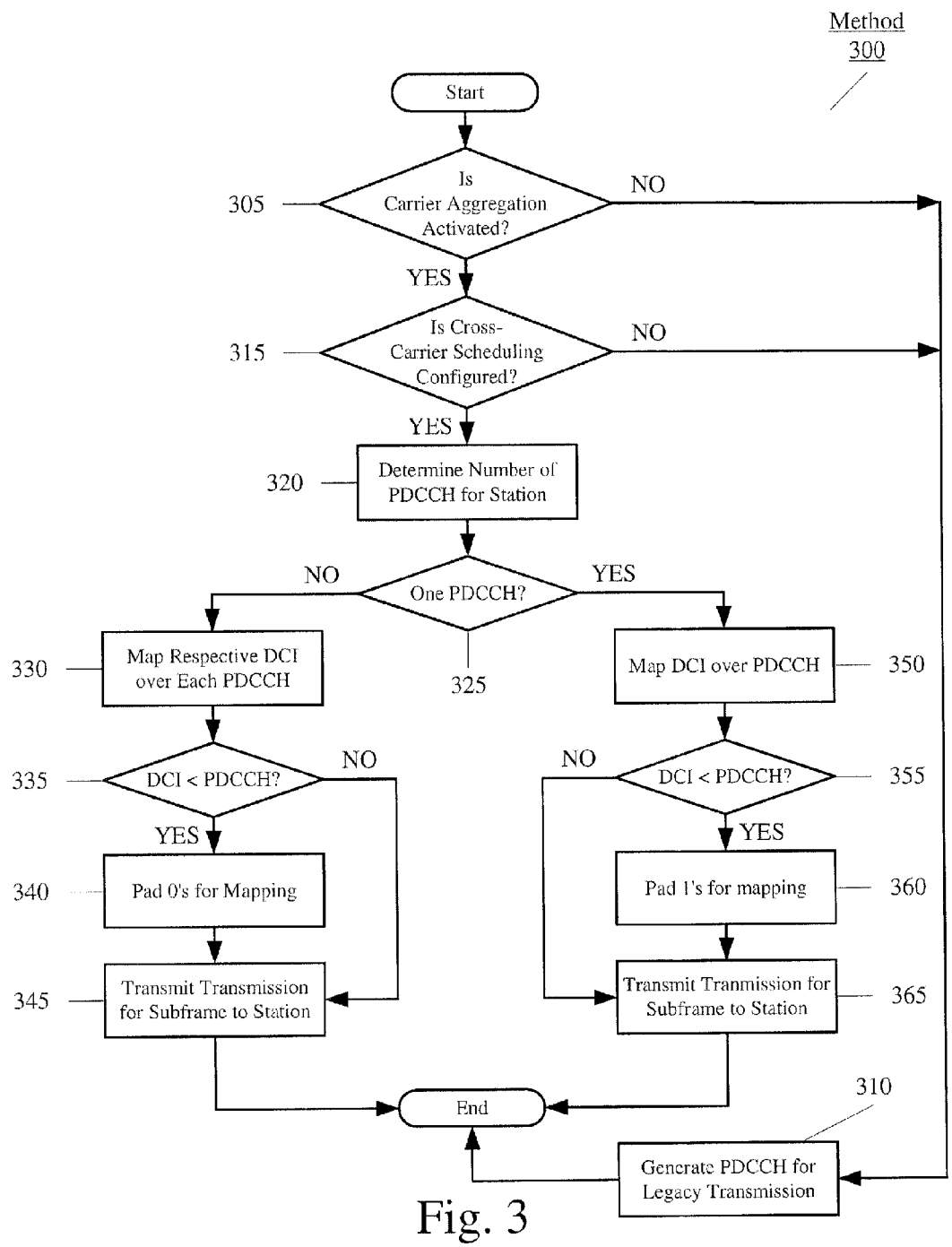
FIG. 3 shows a first exemplary method for generating the modified transmission.

FIG. 3 shows a first exemplary method 300 for generating the modified transmission. The method 300 relates to a transmission side operation of the LTE network 100 in which the eNB 105 generates the transmission for the station 200. The method 300 will be described with reference to the network 100 of FIG. 1.

In step 305, the eNB 105 determines whether the station 200 has carrier aggregation activated. If carrier aggregation is not activated, the method 300 continues to step 310 to generate a PDCCH for a legacy transmission. If carrier aggregation is activated, the method 300 continues to step 315 in which the eNB 105 determines whether the station 200 has cross-carrier scheduling configured. If cross-carrier scheduling is not configured, the method 300 continues to step 310 to generate the PDCCH for the legacy transmission. If cross-carrier scheduling is configured, the method 300 continues to step 325. It should be noted that the ending of the method 300 (e.g., after step 310) is not related to a termination of functionalities of the eNB 105. Specifically, the eNB 105 may utilize known transmission generating algorithms or protocols when these conditions are not satisfied (e.g., generating the legacy transmission).

In step 320, the eNB 105 determines the number of PDCCHs to be included in the transmission to the station 200. Specifically, the eNB 105 determines whether one or more PDCCHs are to be included in the transmission to the station 200 for a particular subframe. Thus, in step 325, if more than one PDCCH is included in the transmission, the method 300 continues to step 330.

In step 330, the eNB 105 maps the DCI information bits over the PDCCH information bits. The eNB 105 may perform this functionality for each PDCCH included in the transmission. In step 335, the eNB 105 determines whether the length of the DCI information bits is less than the length of the PDCCH information bits. If the length of the DCI information bits is equal to the length of the PDCCH information bits (e.g., does not require any padding), the method 300 continues to step 345 in which the transmission for the subframe is sent to the station 200. If the length of the DCI information bits is less than the length of the PDCCH information bits (e.g., may include padding), the method 300 continues to step 340 in which 0's are padded. Subsequently, the transmission for the subframe is sent to the station 200 in which the padding includes 0's.

Returning to step 325, if the eNB 105 determines that there is only one PDCCH included in the transmission, the method 300 continues to step 350. In step 350, the eNB 105 maps the DCI information bits over the PDCCH information bits. As no other PDCCH is included, the eNB 105 performs this functionality to this PDCCH only. In step 355, the eNB 105 determines whether the length of the DCI information bits is less than the length of the PDCCH information bits. If the length of the DCI information bits is equal to the length of the PDCCH information bits (e.g., does not require any padding), the method 300 continues to step 365 in which the transmission for the subframe is sent to the station 200. If the length of the DCI information bits is less than the length of the PDCCH information bits (e.g., may include padding), the method 300 continues to step 360 in which 1's are padded. Subsequently, the transmission for the subframe is sent to the station 200 in which the padding includes 1's.

It should be noted that the method 300 may be performed for each subframe in which a transmission to the station 200 is performed. Each transmission for each subframe may be generated in the above described manner.

Figure 4:
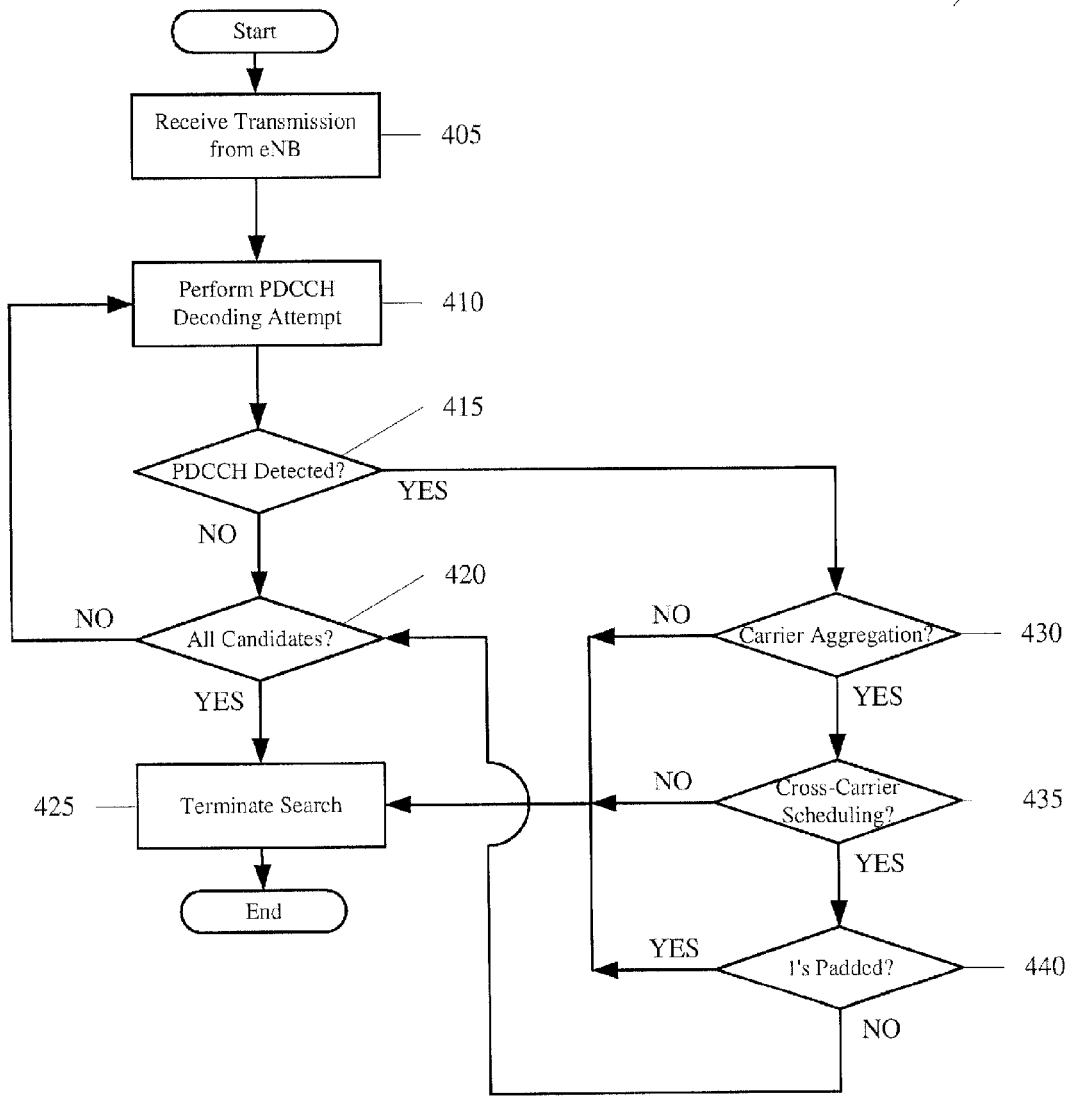
FIG. 4 shows a second exemplary method for decoding the modified transmission.

FIG. 4 shows a second exemplary method 400 for decoding the modified transmission. The method 400 relates to a receiving side operation in which the station 200 receives the transmission from the eNB 105. The method 400 will be described with reference to the station 200 of FIG. 2.

In step 405, the station 200 receives the transmission from the eNB 105. As described above, the transceiver 225 may be used to receive data from the network (e.g., the eNB 105) and send this data to applications or processes being executed by the processor 205. Among this data may be the transmission from the eNB 105 that was generated in accordance with the exemplary process 300 described above. In step 410, the decoding application executed by the processor 205 may perform a PDCCH decoding attempt. As described above, the transmission may be decoded to extract the one or more PDCCH information and the respective DCI.

In step 415, the decoding application determines whether a valid PDCCH is detected. If no valid PDCCH is detected, the method 400 continues to step 420. In step 420, a determination is made whether all candidates for particular carriers have been used to detect a valid PDCCH. If at least one candidate remains, the method returns to step 410. If no further candidates remain, the method 400 continues to step 425 in which the search is terminated.

Returning to step 415, if a valid PDCCH has been detected, the method 400 continues to step 430. In step 430, the decoding application determines whether carrier aggregation is activated. If carrier aggregation is not activated, the method 400 continues to step 425 to terminate the search as only the one C-RNTI configured PDCCH is included in the transmission. If carrier aggregation is activated, the method 400 continues to step 435. In step 435, the decoding application determines whether cross-carrier scheduling is configured. If cross-carrier scheduling is not configured, the method 400 continues to step 425 to terminate the search as only the one C-RNTI configured PDCCH is included in the transmission. If cross-carrier scheduling is configured, the method 400 continues to step 440. In step 440, the decoding application determines whether the PDCCH information bits having DCI information bits mapped thereover has any padding and if that padding is 0's or 1's. If no padding exists or 0's are used for the padding, the method 400 continues to step 420 to search for further PDCCH in the transmission. However, if padding exists and 1's are used for the padding, the method 400 continues to step 425 to terminate the search as the padding indicates that only one PDCCH is included in the transmission.

It should be noted that the method 400 may be performed for each subframe in which a transmission to the station 200 is received. Each transmission for each subframe may be analyzed in the above described manner.

It should also be noted that the exemplary system and method described above using the DCI bits mapped over the PDCCH information bits is only exemplary. In another example, a new signaling field either inside the DCI or the PDCCH may be introduced to achieve a substantially similar result.

The exemplary embodiments provide a system and method of terminating a search for a further PDCCH of a subframe within a transmission to a station from an eNB when a first type of padding is used. Specifically, when the station has carrier aggregation activated with cross-carrier scheduling configured, the eNB may use the first type of padding to indicate that only a single PDCCH is included in the transmission. Thus, when the station decodes the transmission and identifies the first type of padding, a search for any further non-existent PDCCH may be terminated early. In this manner, power may be conserved. A second type of padding may be used when more than one PDCCH is included in the transmission such that the station may perform the search for any and all PDCCH included in the transmission.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform, MAC OS, iOS, Android OS, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
at a station:
receiving a transmission from a base station of a network, the transmission including at least one control channel information, each control channel information having a respective downlink control information (DCI) mapped thereover;
detecting one of the control channel information in the transmission;
determining whether carrier aggregation is activated and cross-carrier scheduling is configured for the station;
determining whether a length of information bits of the DCI is less than a length of the information bits of the control channel information when the carrier aggregation is activated and the cross-carrier scheduling is configured; and
terminating a search for a further one of the control channel information when the length of information bits of the DCI is less than the length of information bits of the control channel information and a first type of padding is used for the mapping of the DCI over the control channel information.

2. The method of claim 1, further comprising:
continuing the search for at least one further control channel information when a second type of padding is used for the mapping of the DCI over the control channel information.

3. The method of claim 1, further comprising:
continuing the search for at least one further control channel information when the length of information bits of the DCI is equal to the length of information bits of the control channel information.

4. The method of claim 1, further comprising:
terminating a search for a further one of the control channel information when one of carrier aggregation is not activated or cross-carrier scheduling is not configured.

5. The method of claim 1, wherein the network is a Long Term Evolution (LTE) network and the control channel is a physical downlink control channel (PDCCH).

6. The method of claim 2, wherein the first type of padding is 0's and the second type of padding is 1's.

7. A method, comprising:
at a base station of a Long Term Evolution (LTE) network:
determining a number of physical downlink control channel (PDCCH) information that is to be transmitted to a station connected to the base station;
generating a transmission including the number of PDCCH information, each PDCCH information having a respective downlink control information (DCI) mapped thereover;
determining whether a length of information bits of the DCI is less than a length of information bits of the PDCCH information; and
when the length of information bits of the DCI is less than the length of information bits of the PDCCH information, padding the information bits of the DCI with one of a first type of padding or a second type of padding, wherein the first or second type of padding is selected based on the number, wherein the first type of padding indicates that the station may terminate a search for a further PDCCH.

8. The method of claim 7, wherein the first type of padding is used when the number is one and the first type of padding indicates to the station that the transmission includes only one PDCCH information.

9. The method of claim 7, wherein the second type of padding is used when the number is greater than one and the second type of padding indicates to the station that the transmission includes more than one PDCCH information.

10. The method of claim 7, further comprising:
determining whether the station has carrier aggregation activated and cross-carrier scheduling configured.

11. The method of claim 7, wherein the first type of padding is 0's and the second type of padding is 1's.

12. The method of claim 7, further comprising:
transmitting the transmission to the station.

13. A station, comprising:
a transceiver configured to establish a connection to a base station of a Long Term Evolution (LTE) network and receive a transmission from the base station, the transmission including at least one physical downlink control channel (PDCCH) information, each PDCCH information having a respective downlink control information (DCI) mapped thereover; and
a processor coupled to a memory, wherein the processor is configured to:
detect one of the PDCCH information in the transmission;
determine whether a length of information bits of the DCI for the detected one of the PDCCH information is less than a length of the information bits of the PDCCH information; and
terminate a search for a further one of the PDCCH information when the length of information bits of the DCI is less than the length of information bits of the control channel information and a first type of padding is used for the mapping of the DCI over the PDCCH information.

14. The station of claim 13, wherein the processor is further configured to:
continue the search for at least one further PDCCH information when a second type of padding is used for the mapping of the DCI over the PDCCH information.

15. The station of claim 13, wherein the processor is further configured to:
continue the search for at least one further PDCCH when the length of information bits of the DCI is equal to the length of information bits of the PDCCH information.

16. The station of claim 13, wherein the processor is further configured to:
determine whether carrier aggregation is activated and cross-carrier scheduling is configured for the station.

17. The station of claim 16, wherein the processor is further configured to:
terminate a search for a further one of the PDCCH information when one of carrier aggregation is not activated or cross-carrier scheduling is not configured.

18. The station of claim 14, wherein the first type of padding is 0's and the second type of padding is 1's.

* * * * *